(12) United States Patent
Finkler

(10) Patent No.: US 8,280,683 B2
(45) Date of Patent: Oct. 2, 2012

(54) PROBABILISTIC FRAMEWORK FOR THE HIGHLY EFFICIENT CORRELATION OF CALL CHAINS WITH HARDWARE EVENTS

(75) Inventor: Ulrich Alfons Finkler, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 1111 days.

(21) Appl. No.: 12/175,057

(22) Filed: Jul. 17, 2008

(65) Prior Publication Data

US 2010/0017791 A1    Jan. 21, 2010

(51) Int. Cl.
*G06F 17/18* (2006.01)
(52) U.S. Cl. ........................................ 702/179
(58) Field of Classification Search .............. 702/179, 702/181; 717/145, 158
See application file for complete search history.

(56) References Cited

U.S. PATENT DOCUMENTS

| | | | |
|---|---|---|---|
| 6,049,666 | A | 4/2000 | Bennett et al. |
| 6,126,329 | A | 10/2000 | Bennett et al. |
| 6,175,957 | B1 | 1/2001 | Ju et al. |
| 6,334,210 | B1 | 12/2001 | Miura et al. |
| 6,839,895 | B1 | 1/2005 | Ju et al. |
| 6,934,935 | B1 | 8/2005 | Bennett et al. |
| 6,971,091 | B1 * | 11/2005 | Arnold et al. ................. 717/145 |
| 7,076,557 | B1 | 7/2006 | LaMacchia et al. |
| 7,318,220 | B2 | 1/2008 | Mehaffy et al. |

OTHER PUBLICATIONS

Rountev et al.; Static and Dynamic Analysis of Call Chains in Java; ISSTA '04; Jul. 11-14, 2004; Boston, MA; 2004; pp. 1-11.

* cited by examiner

*Primary Examiner* — Bryan Bui
(74) *Attorney, Agent, or Firm* — Tutunjian & Bitetto, P.C.; Preston J. Young

(57) ABSTRACT

A system and method for correlation of resources with hardware events includes event driven sampling a call chain of functions to determine when functions of the call chain are active. The call chain is mapped to execution times based upon a probabilistic integration of the functions such that when portions of the call chain are active, resources associated with call chain activity are correlated with hardware events.

25 Claims, 5 Drawing Sheets

PROBABILISTIC FRAMEWORK FOR THE HIGHLY EFFICIENT CORRELATION OF CALL CHAINS WITH HARDWARE EVENTS

BACKGROUND

1. Technical Field

The present invention relates to program profiling and more particularly to a system and method for profiling resource use with correlated hardware events.

2. Description of the Related Art

Profiling is an essential and widely used technique to understand the resource use of applications. While efficient tools for the profiling of execution time are available, the choices for detailed profiling of other hardware resources, e.g. cache misses or memory use are very limited or non-existent.

There is a rich body of literature on sampling and profiling. Typical time profilers sample periodically the sub-routine or code line and instrument each function call. The function call counts are used to reconstruct a call graph. Location based sampling can provide very misleading results. One approach gathers more context by keeping track of the call history. While providing more accurate results, it requires the instrumentation of all function calls analogous to Gprof and bookkeeping to track the history, which causes significant overhead. Gprof is an open source profiling program known in the art. Using Gprof often increases execution time by a factor of two or more.

The memory profiling tools found in the art can be classified into several categories. There are tools with little impact on execution time and memory use which sample the so-called high water mark over time (e.g., the Unix tool top). This is clearly insufficient to localize bottlenecks in large applications. The strategy of sampling at periodic time intervals is not applicable to profiling of memory use by code location or call chain. The performance impact of sampling the state of the heap is too costly and significant errors are possible due to the lack of correlation between memory use and execution time. An application can allocate and deallocate a significant amount of memory in a very short period of time.

Another category of tools records every allocation and deallocation. If only the code location is sampled, the results can be misleading. Furthermore, the execution time can be several times larger than for an unprofiled run. The recording of entire call chains improves the profiling information, but causes even more overhead. This category provides correct attribution of memory use to call chains, but the memory use analysis is only possible at singular snapshots during the program. It is difficult to hit the interesting spots in large applications that run for many hours. The allocation/deallocation category often increases the runtime of a program by an order of magnitude and also increases the memory use of the application by a factor of two or more rendering it useless for very large applications.

"Rational Purify" shows similar increases in execution time and memory usage. These tools investigate memory access errors and other problems in small and short program runs, but they are not well suited for the investigation of the memory use of application runs that already require significant time and which already push the memory capacity of a system to its limit without profiling.

Another common approach is simulation based on code or program traces, which allows detailed analysis of applications but causes far too much execution time overhead for the performance analysis of very large applications. A low overhead sampling approach for memory leak detection has been proposed for sampling code segments adaptively at a rate inversely proportional to their execution frequency. This is not applicable for memory usage due to the lack of correlation of memory usage with execution time or execution frequency. While memory leaks persist after creation, memory allocations have a limited life time.

SUMMARY

Profiling is widely used technique to understand the resource use of applications. While efficient tools for the profiling of execution time are available, the choices for detailed profiling of other hardware resources, e.g., cache misses or memory use are very limited. In the present disclosure, tools are provided with sufficiently accurate insight without adding unacceptable overhead in memory use and execution time for the performance analysis of very large applications.

In this disclosure, a highly efficient probabilistic method for profiling that provides detailed resource usage information indexed by a full call chain and time is presented. An analytical framework with error estimates permits analyses of different profiling scenarios. This probabilistic approach was employed to implement a memory profiling tool that adds minimal overhead and does not require recompilation or relinking. A tool in accordance with the present principles provides the memory use $M_\psi(t)$ of each call chain $\psi$ over a time line. Experimental results confirm that execution time and memory overhead is less than 10% of the unprofiled, optimized execution.

A system and method for correlation of resources with hardware events includes sampling a call chain of functions at events to determine when functions of the call chain are active. The call chain is mapped to execution times based upon a probabilistic integration of the functions such that when portions of the call chain are active, resources associated with call chain activity are correlated with hardware events.

A system for correlation of resources with hardware events includes a program module stored on computer readable media and configured map resources to call chains. The program module includes a sample module configured to sample a call chain of functions at intervals to determine when functions of the call chain are active; and a mapper configured to map the call chain to hardware events based upon a probabilistic integration of the functions such that when portions of the call chain are active, resources are associated with call chain activity.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
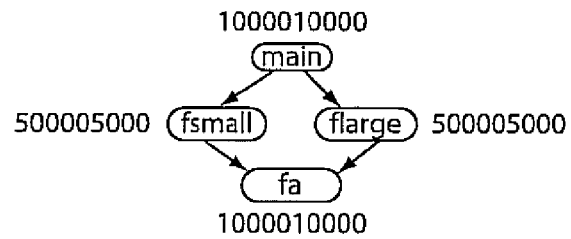
FIG. 1 is a call graph showing costs assigned to nodes thereof.

Highly efficient probabilistic systems and methods for profiling are provided that include detailed resource usage information indexed by full call chain and time. A call chain is the history of function calls formed when one method calls another method. An analytical framework is provided with estimates of the accuracy for different profiling scenarios. This probabilistic approach is applicable to implement a memory profiling tool that adds minimal overhead and does not require recompilation or relinking. The tool provides the memory use of each call chain over a time line. An upper bound can be provided for the memory overhead compared to an unprocessed run, and experimental results confirm that execution time and memory use overhead is less than 10% of the unprofiled, optimized execution.

A novel probabilistic profiling approach for general resource use is provided that permits the creation of profiling tools with very small relative overhead, e.g., a small ratio of the time and memory use of the profiled run compared to the time and memory use of the unprofiled run, respectively. The general profiling mechanism permits estimation of resource use R(t) over time for all call chains ψ in a program run for a resource R, e.g., memory use. An analytic framework allows the estimation of error margins for varying scenarios, and upper bounds are provided for the memory overhead for its application in memory profiling.

A memory profiler has been implemented based on this probabilistic approach. It can be applied to an existing optimized binary without recompiling or relinking. A program run with tracing produces an overview of all call chains that allocated memory and the peak memory that each call chain used. The overview provides information about memory leaks. Additionally, a compressed trace file is created that permits extraction of the memory use of each call chain over the execution time of the program.

The memory tracing was applied to sizeable very large scale integration (VLSI) design automation applications which ran for many hours and used many GB's of memory. Additionally, worst case scenario routines were traced as well as some standard applications. The experimental results confirm very low relative overhead. Execution time and memory use of traced applications increased by less than 10% in memory and execution time compared to optimized, untraced runs. The worst case scenario experiments confirm that the execution time overhead is in the order of magnitude of the time spent in a malloc subsystem or less.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

An illustrative program shows an extraction of a Gprof-report. The program will be employed to demonstrate context dependency in accordance with the present principles.

Program A:

```
extern int fa(unsigned size) {
    unsigned j,tmp=0;
    for (j=0;j<size;j++) {
        tmp+=j; tmp = tmp%5555555;
    }
}
extern int fsmall(unsigned size) {
    return fa(size);
}
extern int flarge(unsigned size) {
    return fa(size);
}
int main(void) {
    unsigned j, tmp;
    for (j=0;j<1000;j++) {
        tmp += fsmall(10);
        tmp += flarge(1000000);
    }
    return tmp;
}
```

-continued

```
index %time self children called     name
 [1] 100.0  0.00  65.56              main[1]
            0.00  32.78  1000/1000   fsmall[4]
            0.00  32.78  1000/1000   flarge[3]
```

For any form of time profiling the accuracy of the mapping of fractions of the execution time to the program structure is one important consideration. Often a program spends a significant amount of time in a single routine, but this routine is used in different contexts. Thus, profilers like Gprof provide execution time estimates for a call graph, not only for subroutines.

In program A, Gprof reports that the functions fsmall and flarge require similar amounts of time, but flarge performs 100000 times more operations than fsmall.

Referring now to the drawings in which like numerals represent the same or similar elements and initially to FIG. 1, a call graph for program A and costs assigned to nodes when binning samples by call location are illustratively shown. In this case binning samples by call location are provided by a subroutine on top of a stack. To establish the call graph, Gprof uses the counts of function calls and assumes that all calls to one function f require the same amount of time. This assumption is often incorrect. The call graph for program A shows how cost is assigned to the nodes. For nodes, main and fa, the cost is 1000010000, and for nodes, fsmall and flarge, the cost in 500005000.

As this example demonstrates, the execution time of a particular call to a function f may strongly depend on its context. Memory profiling based on call location (e.g., code line or function call etc.) is affected by the same problem. Often the majority of the memory is allocated by a few standard containers that are employed in many different contexts. This is demonstrated by a second example, program B.

The Valgrind-tool Massif, which is known in the art, is aware of the call chains (the output shown below program B was run with –depth-10), but similar to Gprof it attributes roughly the same amount of resource to fsmall and flarge although it considers call chains of a depth up to 10.

Program B with extract from Massif-report run with –depth=10:

```
typedef int *Basetype;
unsigned findex=0;
Basetype field[2100000];
extern int *fa1(unsigned size) {
    return field[findex++] = new int [size];
}
extern int *fatop(unsigned size) {
    return fa1(size);
}
extern int *fsmall(unsigned size) {
    return fatop(size);
}
extern int *flarge(unsigned size) {
    return fatop(size);
}
int main(void) {
    int j, *tmp;
    for (j=0;j<1000000;j++) {
        tmp = fsmall(2);
        tmp = flarge(100);
    }
    return (int)tmp;
}
```

==3==========================
Context accounted for 49.8% of measured spacetime
0x80484C3: fa1(unsigned)
0x80484F3: fatop(unsigned)
0x8048520: flarge(unsigned)
Called from: 49.8%: 0x8048564: main
--------------------------------
Context accounted for 47.7% of measured spacetime
0x80484C3: fa1(unsigned)
0x80484F3: fatop(unsigned)
0x8048520A: fsmall(unsigned)
Called from: 47.7%: 0x8048554: main Full Call Chains: The two examples Program A and Program B demonstrate that the binning of profiling information based on the function call or code line (location) can be misleading. We found that this is the case in particular for very large applications that heavily use standardized containers, e.g., STL.

For the profiling of execution time, there exists an alternative which causes very low impact and produces accurate assignments of runtimes to call chains, the binning of profiling information by the full call chain. For example, each single sampling event is attributed with the entire call chain present on the stack at the time the sample is taken.

Monte Carlo Execution Analysis (MCXA) uses this technique, sampling the entire stack of a process or thread at fixed time intervals. The sampling is possible on optimized code since no instrumentation to determine call counts is necessary. In particular, for long running programs, MCXA can use large sampling intervals and thus minimize the execution impact, such that the execution time only grows by a few percent compared to an optimized and unprofiled run. The measured times provided by MCXA are not only much more accurately mapped to call chains when compared to Gprof, they also correlate very closely to the execution time of the optimized code without profiling.

Figure 2:
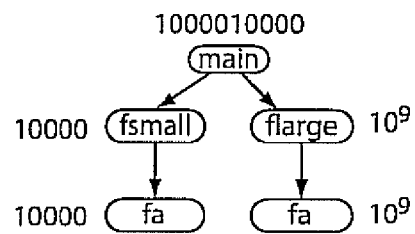
FIG. 2 is a call tree showing costs assigned to nodes when binning samples by call chains.

Referring to FIG. 2, a call tree and costs assigned to nodes for program A are shown when binning samples by call chain. For each path in the call graph there is one leaf node. FIG. 2 shows the call tree for program A and how MCXA assigns costs to nodes (main, fsmall, fa, flarge, fa) based on binning samples by call chain. Note that sampling by call chain cannot be done by considering only the call graph. It is necessary to consider the call tree, which is in general much larger. For each call chain, costs (e.g., at the node main costs include: 1000010000, at each of leaf node in the chain, fsmall and fa, costs include: 10000, and at each leaf node in the chain, flarge and fa costs include: $10^9$) are assigned to a unique leaf node. MCXA profiling of execution time inspired the wish for a similar profiling tool for more general resources, in particular memory use.

Sampling and Numerical Integration: Many profiling tools use sampling at fixed time intervals. Gprof samples the top of the stack in periodic intervals to determine which function is currently executed and additionally counts how often each function is called. The top of the stack specifies a 'program counter location', e.g., the subroutine in which the counter resides or the line number in the code.

Figure 3:
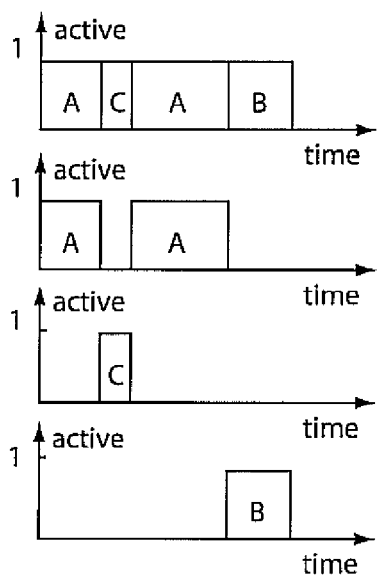
FIG. 3 is a diagram showing periodic sampling of program counter locations interpreted as a sequence of numerical integrations for call locations.

Referring to FIG. 3, a periodic sampling of program counter location is interpreted as a sequence of numerical integrations for call locations A, B, C, D (i.e. chain, function or code line).

At each point in time during the lifetime of a program or thread exactly one program counter location $\psi$ (e.g. a function or code line) is active. This can be interpreted as a sum of functions:

$$\sum_\psi p_\psi(t) \text{ with } p_\psi(t) = \begin{cases} 1 & \text{if } \psi \text{ active} \\ 0 & \text{otherwise} \end{cases}$$

for each code location $\psi$. A code location $\psi$ of the program is called active if it is on top of the stack. This interpretation of execution time sampling explains how well execution time is attributed to the various locations $\psi$ by periodic sampling.

Profiling attempts to determine the time T for which a code location $\psi$ is active.

$$T = \sum_\psi T_\psi$$

is the total execution time of the program since only one subroutine can be at the top of the stack at any given time. Then, $$T_\psi = \int_0^T p_\psi(t)dt$$

is the total time that location $\psi$ was active.

Sampling at periodic time intervals $\tau$ can be interpreted as a numerical integration, e.g. as an extended trapezoidal rule $$T_\psi \approx \tau\left(\frac{p_\psi(\tau)}{2} + p_\psi(2\tau) + p_\psi(3\tau) \ldots + \frac{p_\psi(N\tau)}{2}\right) + O\left(\frac{Tp_\psi''}{N^2}\right).$$

The error bound provided by any (extended) Newton-Cotes formula is not really useful in this case since it contains a derivative of $p_\psi(t)$ which has singularities.

The periodic sampling can also be interpreted as a pseudoMonte-Carlo integration. Monte-Carlo integration based on a random selection of sampling points provides an approximation whose one standard deviation error estimate decreases with the square root of the number of sampling points.

$$T_\psi \approx \frac{T}{N}\sum_{i=1}^N p_\psi(i\tau) \pm T\sqrt{\frac{<p_\psi> - <p_\psi>^2}{N}}$$

Periodic sampling points are not random and can be considered a quasi-random sequence of minimal discrepancy, such that the one standard deviation error estimate declines proportional to 1/N instead of $$\sqrt{\frac{1}{N}}.$$

Via the Koksma-Hlawka inequality the error estimate is bound by the product of the variance of the integrated function and the discrepancy of the sequence.

$$\left|\frac{1}{N}\sum_{i=1}^N f(x_i) - \int f(u)du\right| \leq V(f)D_N(x_1, \ldots, x_N).$$

This interpretation of execution time sampling explains how well execution time is attributed to the various locations $\psi$ by periodic sampling.

Resource Profiling: Time profiling maps a call chain $\psi$ to the time $T_\psi$ that is spent in $\psi$. More general resource profiling, e.g. memory profiling, maps a call chain $\psi$ to a function $M_\psi(t)$, the amount of resource that is owned by $\psi$ at a given time t. For example, memory is called "owned" by a call chain $\psi$ if it was allocated under $\psi$. Cache misses are called owned by $\psi$ if they occurred while $\psi$ was active.

Figure 4:
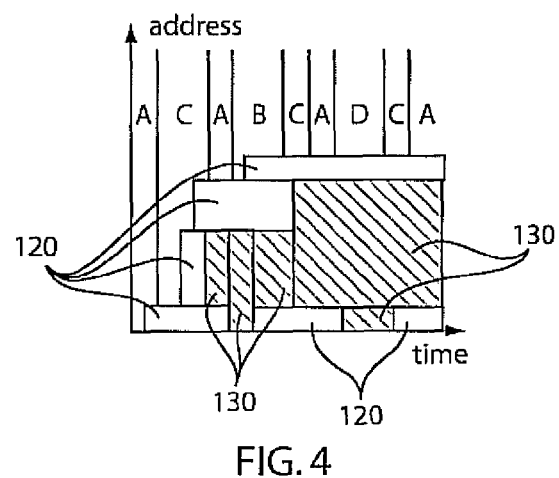
FIG. 4 is a diagram showing an example of memory profiling showing allocated and deallocated blocks.

Referring to FIG. 4, an example of changing memory ownership over time is illustratively shown to demonstrate the problem of memory profiling. Address (location) is plotted versus time. Light blocks 120 are allocated, dark blocks 130 were allocated and then deallocated, i.e., they remained on the heap. Deallocated blocks (130) may be coalesced. Call chains (designated as A, B, C, and D in FIG. 4) are shown only for program routines, not system calls (i.e., allocation).

For any point in time there can be a large number of call chains that own memory blocks. Furthermore, the ownership can change without that the total amount of memory changes. Thus, general resource profiling is significantly harder than time profiling. Memory profiling is of particular interest since it is a resource that is allocated and deallocated. Profiling, e.g., cache misses can be considered a special case in which only allocations occur.

Figure 5:
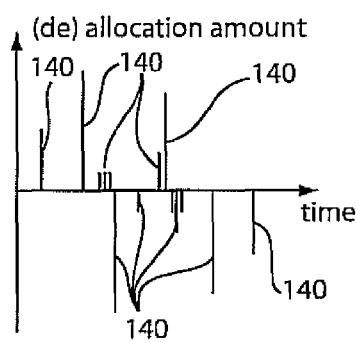
FIG. 5 is a graph showing (de)allocation amount versus time for allocation events where the peak heights reflect the size of the allocation.

Referring to FIG. 5, allocation events as a function over time are illustratively shown. A height of peaks 140 reflects the size of the allocation, not the peak of a $\delta$ distribution ($\delta$ is Dirac's delta function). FIG. 5 shows another view of the problem of memory profiling. A memory operation can be considered an element $s_i$ in an ordered set S. $|s_i|$ is the size of the allocated block and the sign indicates allocation or deallocation.

$$M(t) = \int_0^t \sum_i (s_i\delta(\tau - t_i))d\tau = \int_0^t B(\tau)d\tau$$

is the memory use as a function of time, t is the time at which (de)allocation i occurred, and $\delta$ is Dirac's delta function, a common distribution in mathematics.

Analogous to time profiling the contributions from the call chains form a sum $$M(t) = \sum_\psi M_\psi(t)$$

and the problem can be mapped into a series of numerical integrations. A sample that hits a call chain $\psi$ is counted with contribution zero for all other call chains. The error estimate for a call chain provides information on how well memory usage is attributed to the different call chains. Note that this mapping holds for many other types of resource use events, e.g. cache or Table Look-aside Buffer (TLB) misses, which form discrete events over the time line. If the resource 'density' B(t) can be characterized by a continuous function, the numerical integration can be applied directly.

Since many systems do not correlate well with periodic sampling event driven sampling is employed in accordance with the present principles. A call chain of functions is event sampled to determine when functions of the call chain are active. The call chain is mapped to hardware events based upon a probabilistic integration of the functions such that when portions of the call chain are active, resources are associated with call chain activity. Advantageously, a coordinate transformation is performed which creates a sequence of desirable properties out of what comes from event driven sampling. This will be explained in greater detail hereinafter.

Event Space Integration: The $B_\psi(t)$ is not a proper function but a distribution and not very suitable for numerical integration. To transform the time integral into something more suitable for numerical integration so that event driven sampling and numerical integration can be performed, we take advantage of the fact that $B_\psi(t)$ is zero in any open interval $(t_j, t_{j+1})$. For example, to compute $M(t)$ it is only necessary to evaluate the numerical integral at times $t_j$.

Figure 6:
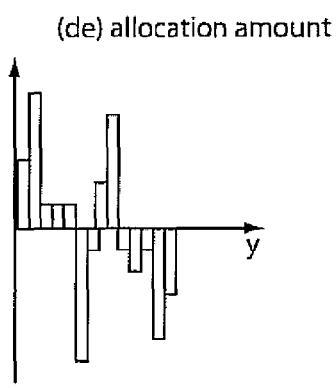
FIG. 6 is a graph showing (de)allocation amount versus time for allocation events of FIG. 5 where the events are shown as distributions.

Referring to FIG. 6, a coordinate transformation $t \rightarrow \gamma$ is introduced which compresses the intervals $(t_j, t_{j+1})$ to a single point and which expands the points $t_j$ to intervals $(j-1, j]$ to obtain a distribution $B_\psi(\gamma)$. FIG. 6 shows allocation events from FIG. 5 as depicted as a distribution. The variable $\gamma$ is dimensionless. The numbers $j \in 1 \ldots N$ enumerate the (de)allocation operations. It holds that $M_\psi(t_j) = M_\psi(j)$.

$B_\psi(\gamma)$ is much better suited for Monte-Carlo integration.

$$M(\gamma) = \int_0^\gamma B_\psi(\eta) d\eta \approx \frac{1}{N} \sum_{i=1}^N B(\gamma_i) \pm V(B_\psi) D_N(\gamma_1, \ldots, \gamma_N).$$

With equidistant sampling points over $\gamma$ the error decreases like $O(1/N)$ (pseudo-random sequence of minimal discrepancy), with random sampling points over $\gamma$ the error decreases like $\sqrt{N}$. This permits numerical integration techniques to be employed for hardware or activity that does not appropriately comply with a time scale. Instead, a probabilistic integration approach is employed to map activities to different scale so that numerical integration techniques can be employed.

Variance Reduction: The error estimate is proportional to the variance $V(B_\psi(\gamma))$. Locations in $\gamma$ with large values of $|B_\psi(\gamma)|$ are more relevant than locations with smaller values. Variance reduction changes the sampling density to sample more relevant regions more densely.

Importance sampling is a strategy to adjust sampling density relative to the relevance of the data points, here relative to $|B_\psi(\gamma)|$.

$$\int f dx = \int \frac{f}{\rho} \rho dx \approx \frac{1}{N} \sum_{i=1}^N \frac{f(x_i)}{\rho(x_i)} \pm V\left(\frac{f}{\rho}\right) D_N(x_1, \ldots x_N)$$

with $$\int \rho dx = 1.$$

The sizes of allocations, i.e., the possible values of f are integer numbers. Thus, it is possible to choose $\rho(x)$ such that $f/\rho$ is a constant by adjusting the sampling density $\rho$ proportional to the block size. There is a selection of sampling points that are advantageous to implement, minimize relative impact and constitute a $\rho$ for which $f/\rho$ is limited by a small and controllable constant.

Scenarios: The mapping of resource use by call chain to numerical integration provides a set of tools that permits the derivation of strategies for different scenarios. One aspect that determines a particular scenario is the type of measurement that is available. A few scenarios where the present principles are applicable include: Current value, e.g. current amount of memory used; Integrated value, e.g. time spent or number of cache misses since the last measurement; Average value, e.g., average number of cycles per instruction since last measurement; Another aspect is the available trigger of a measurement, e.g., periodic sampling may be used, e.g., measure every x seconds or every y cache misses; random sampling, e.g., trigger measurements at random points with known distribution of the sampling points; event triggers, e.g., trigger a measurement event at an allocation; integration threshold, e.g., trigger a measurement each time a fixed number of events have accumulated; differential threshold, e.g., trigger a measurement each time a moving average leaves a window, e.g. ±N %.

Furthermore, the scope of the measurement plays a role. A determination of whether the measurement is performed for a process, a thread or the entire system may be made. The combination of available triggers, available types of measurement and the scope of the measurement depend on the system and the resource of interest. A few example scenarios follow to illustrate these concepts.

Time Profiling: Time profiling by call chain uses an integrated value (e.g. CPU time since last measurement) and periodic sampling (e.g., the dimension of measurement is the same as the sampling dimension). As described, this maps to a rather efficient numerical integration for a single threaded process, since we have a sequence of minimal discrepancy. Additionally, the integrated functions are limited to values of one and zero.

For a multi-threaded process, the mapping of the scope of the measurement (a process) and the desired result (CPU time per call chain) is less obvious. Now, multiple call chains can be active at one time. Performing a single measurement at periodic time intervals has to randomly select one of the call chains and assign the cumulative CPU time of all threads. When considering the entire event space, the measurements do not form a sequence of minimal discrepancy anymore. Extending the call chain by the thread id and taking one sample for each active thread at periodic times allows a reduction in the measurement error.

Cache Misses: Performance counters provide integrated measurements, e.g., the number of cache misses incurred on a core, i.e., the measurement scope does not match the desired observation scope of a process or thread. If an integration threshold is available as a trigger, the task is analogous to memory profiling as described above, except that the chain $\psi$ has to be extended by the thread id and process id. Only periodic sampling may be available, and the correlation between time and the number of cache misses may be significant. This creates a scenario similar to time profiling. Again, $\psi$ has to be extended by thread and process id to extract measurements for the desired scope. In this case, periodic sampling in the time domain does not provide a sequence of minimal discrepancy in the domain of interest, i.e., the number of cache misses that occurred so far.

Due to the strong correlation between elapsed time and cache misses (there is a minimum time spent per cache miss), one can construct bounds for the discrepancy of the sequence used for integration (event driven). For example, since a minimum density of sampling points per cache miss is given and sampling points in periods without cache misses do not contribute to the integral, one may argue that the error behaves at least as well as random sampling, i.e., it decreases with $$\frac{1}{\sqrt{N}},$$

where N is the minimum number of sampling points per cache miss.

Memory Profiling: Memory profiling by call chain may be performed by sampling the call chain and the current amount of memory used (event driven sampling). This provides a numerical integration. There is no direct correlation between changes in memory use and time, i.e., when mapped onto the memory axis, we cannot even assume random sample points with a known distribution. Additionally, the amount of memory that is currently used may cover a wide selection of values. In short, we cannot provide a quantitative bound for the error estimate. With a different type of measurement and trigger, an error estimate and integration with a sequence of minimal discrepancy can be achieved. Below steps will be described that allow a partitioning of the problem to limit the integrated functions to values of zero and one, and to take advantage of the known correlation of allocations and deallocations. The scope of measurement is the process, since the heap (or set of heaps) of a process is instrumented.

Implementation: The more practical aspects of the probabilistic approach will now be described for the example of memory profiling with a tool called MemTrac™ in accordance with the present principles, namely, the gathering of call chains with minimal overhead and the improvement of accuracy while maintaining low relative overhead. While we are not able to improve the asymptotic behavior of the error, which decreases with 1/N, we can reduce the error by a significant constant factor.

Size Bundling: Memory profiling aims to determine $M_\psi(t)$ with predictable accuracy and low relative overhead, e.g., the increase in total memory use and execution time is limited to a few percent of the time and memory used by an optimized and unprofiled run. Fortunately, it is not the absolute but the relative overhead per allocation operation that is of greater importance. Assume a program spends a time $t_u$ using an allocated block B. It takes the time $t_m$ to collect data about the allocation of the block. If $t_m \ll t_u$, then the absolute time $t_m$ can be large without impacting the overall performance of the program significantly.

A memory block B that was allocated is at least initialized. Thus, for the vast majority of applications there is a lower bound for the time spent on accessing a memory block B. This initialization time $T_i(B)$ grows proportional to the size of B. As long as in the average $T_i(B)$ is significant compared to the time necessary to record an allocation, profiling can afford to create a record of the allocation and deallocation of B.

So only for blocks B smaller than a certain threshold size $S_t$, the direct recording of allocation events increases the relative overhead caused by the profiling mechanism. Thus, the memory (de) allocations can be partitioned: $M_\psi(t) = M_\psi^{<S_t}(t) + M_\psi^{>S_t}(t)$ such that the contribution of blocks $M_\psi^{>S_t}(t)$ that are larger than the threshold size is computed exactly. This reduces the range of values obtained at sample points and thus the variance of $B_\psi^{<S_t}(t)$ compared to the variance of $B_\psi(t)$.

Next, we can partition the problem of approximating $M_\psi^{<S_t}(t)$ into a series of subproblems. The size range 1 ... b is partitioned into n buckets of allocations of sizes $s_i$ such that each allocation is assigned to the smallest possible bucket.

$$M_\psi^{<S_n}(t) = \sum_{i=1}^{n} (M_\psi^{S_i}(t) + \Delta(S_t)).$$

$M_\psi^{S_i}(t)$ is the memory "owned" by call chain ψ which falls into allocations in size bucket i. The bucketing can be chosen such that the error term $\Delta(St)$ is bound by a constant fraction of the memory that is actually owned $\Delta(S_t) < C_1 M_\psi^{S_i}(t)$ Each subproblem determines $M_\psi^{S_i}(t)$ for blocks of one fixed size $s_i$ for all ψ. Since there is typically a strong correlation between call chain and allocated block sizes, this further reduces the variance of the numerical integration for each call chain.

Page Bundling: Computing the correct memory contributions from call chains above a certain threshold size and bundling smaller allocations into buckets by size corresponds well to a common allocator strategy. Bucket based allocators bundle allocation blocks from one bucket into memory pages, such that one page contributes only blocks of one size corresponding to one bucket. Allocations above a certain size threshold are handled on a per-allocation basis, e.g. by using mmap or a Cartesian tree, which are known allocation techniques.

Consider the subproblem of profiling allocations of one specific size, i.e., events from one bucket. If there are only allocations, then recording the event of a new page allocation is equivalent to sampling periodically the allocation events. If page allocations are chosen as the sampling points for allocations, the corresponding page deallocation provides a matching sampling point for deallocations. The allocation sample point assigns the entire page to the currently active call chain, and the deallocation can be assigned to the same call chain. This page bundling improves the accuracy of the memory usage estimate by properly incorporating the correlation between allocation and deallocation.

This scheme can be considered as a form of importance sampling, the sampling density varies from 100% (for block sizes above the threshold) down to a lower bound with varying numbers of blocks per page for the varying buckets. The larger the variance in B(t), the higher is the sampling density.

In terms of accuracy, if the bucket allocator that is actually used for production runs drives the choice of sampling points with its page allocations, the memory use including heap fragmentation is measured accurately by the memory profiling. Often, this is the more interesting measure for an application, since it is interested in the real resource use. Heap fragmentation includes memory use inside a heap to maintain its data structures, unused memory in blocks due to alignment requirements and marker prefixes, and memory that is held in pages that are partially free.

Online Compression: Even with the reduction of events by sampling as described above, trace file sizes and the time to write them would be prohibitive if the resulting events were recorded directly. Thus, we employ two forms of online compression that reduce the stream of sampled events to a stream of deltas (changes) associated with call chain indices. A table-based compression permits recording only a call chain index per event and a table that maps full call chains to indices. A lossy compression scheme records only accumulated deltas that may cover multiple events. For this purpose, two dictionaries may be employed.

Figure 7:
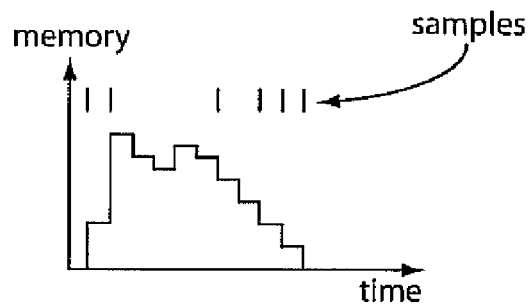
FIG. 7 is a graph showing an example of memory development for a call chain with sample points recorded for lossy compression with a threshold of 30%.

A first dictionary, used for the lossy compression, uses call chains as keys and stores the amount currently owned for a call chain. Each allocation event for a call chain increases or decreases the amount owned. A record is only written if the change is larger than a fraction of the last recorded value as illustrated in FIG. 7. This eliminates small fluctuations that otherwise bloat the trace files with controllable impact on the accuracy.

FIG. 7 is an example for memory development (memory versus time) for a call chain showing recording points (samples) for lossy compression with a threshold of 30%. The large threshold was chosen for illustrative purposes, the threshold may be smaller in practice (e.g., 5% or less).

A second dictionary provides the mechanism to find a record of an allocating call chain based on the address of a deallocated block. The second dictionary uses the address of an allocated block as a key and holds a reference to the record of the allocating call chain as well as the block size for each block currently used. Upon deallocation the call chain record is updated and the block record deleted. Since each event carries a time stamp each update of a call chain record provides one data point for each $M_{\psi}(t)$, one of which is non-zero.

The table based compression of the trace data results from recording only a call chain index from the first dictionary and recording the accumulated call chains from the first dictionary with their indices (table based compression). Note that using the page records to drive the sampling helps to limit the memory overhead due to tracing. For every used block, the tracer has to hold a block record. The block record needs 6*sizeof(void*), but the smallest allocation event to record is the bucketing threshold, in the present case of size 64*sizeof(void*). In fact, in practical applications most events are actually page allocations, in the present implementation of size 1024*sizeof(void*). Thus, the application allocates at least 10 times and on the average 100 times as much memory as the tracer needs to keep track of the blocks. The remaining memory overhead of the tracer is needed for the call chain records.

Forked Tracing: The implementation of the trace generation with lossy compression and the event generation through instrumenting a bucketing allocator is fairly straightforward. The online accounting generates a fair amount of allocations. Additionally, there are millions of dictionary lookups with rather long keys, the call chains. The most interesting traces were performed on VLSI applications (e.g., Design Rule Checking (DRC) and 'Layout Versus Schematic' (LVS)) checking, placement driven logic synthesis) with several hundreds of thousands of lines of code and call chain lengths of dozens of steps. Additionally, the number of call chains is rather unpredictable and can be large. The VLSI LVS application generated events in over 5000 call chains on optimized code.

To minimize the disturbance of the traced process, only the event generation takes place inside of the traced process itself. The online accounting, compression and trace generation is performed in a child process which is forked at the first trace event. This separates the allocations of the tracing and the traced code and takes advantage of available additional processors. In multi-threaded applications that use multiple heaps, one child can be forked for each heap.

Due to the sampling, the average throughput of the tracer is about at least 10 times higher than the event generation rate of the traced process over the entire run. This is not the case for short sequences of code that perform mostly allocations, e.g. the building of a linked list. Even on a single processor, the forking of the tracing process reduces the performance impact, since events can be buffered without disturbing the traced process such that short bursts of allocation events do not stall the traced process.

Figure 8:
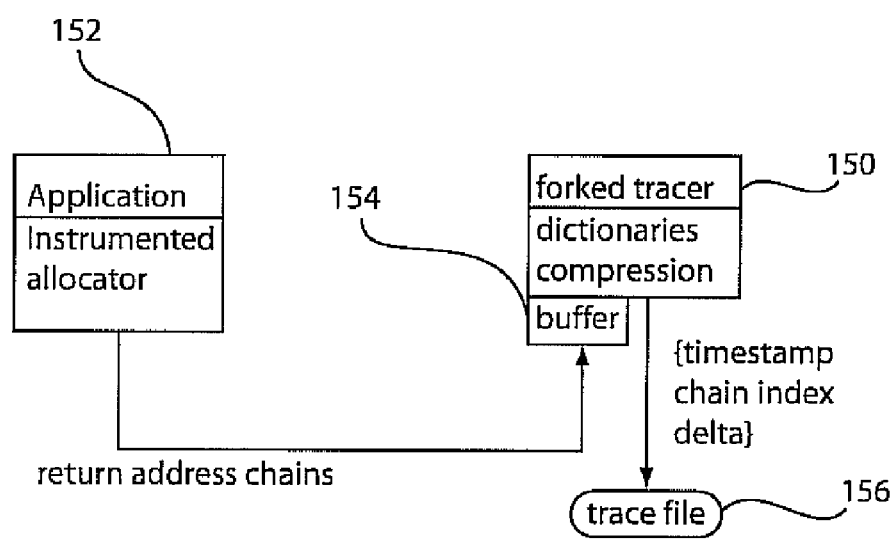
FIG. 8 is a block diagram showing a tracer process showing a tracer and dataflow for the process.

Referring to FIG. 8, a tracer process with a tracer and data flow are illustratively depicted. A tracer such as a forked tracer 150 traces call chains in an application 152. The application 152 is instrumented to generate call chain addresses which are input to the tracer 150. A buffer 154 may be employed to receive the chain addresses. The tracer 150 creates a trace file 156, which includes time stamped chain index changes (deltas). The tracer 150 may employ dictionary compression as described above.

Cached Symbol Extraction: Efficient handling of the call chain records (156) is a challenge. There are two performance bottlenecks, the extraction of the symbols from the stack trace and the handling of the call chains as keys. The most significant performance improvement in the call chain handling was achieved by caching symbols for program pointers. The forked process (150) accumulates a dictionary such that, for each pointer encountered on the stack, the text symbol is determined only once via the traceback table, and this lookup occurs in the child process. The stack holds, for each of its steps, the return address in the code. Such a return address is located inside a code block that is associated with a function and the symbolic name of the function is obtained through a traceback table. Finding the traceback table for a return address and extracting the symbol employs one to two orders of magnitude more compute time than tracing one step of the stack and obtaining the return address.

For programs that use conventional shared libraries, the address of each code location, and thus each return address, is determined when the program is loaded. Thus, the return addresses, traceback tables and symbols are identical for the traced process and for the forked child. Thus, the parent can pass return addresses to the child and the child performs the expensive symbol lookups and maintains a dictionary that maps return addresses to symbols to minimize the lookup costs.

Thus, the call chains form keys in the form of dozens of pointers and are fairly degenerate, i.e., there are common prefixes and postfixes. Hashing has to evaluate the entire key and a comparison-based tree looks in the average $O(\log(N))$ times at a significant number of call chain steps to determine a difference.

A tree structure called PATRICIA (known in the art) turned out to be an excellent solution. A PATRICIA is a binary tree based on comparison of individual bits. Rather than comparing a bit of a fixed position on each level of the tree, it records in each node the index of the differentiating bit. In the average case, the number of bits evaluated in a search, insertion or deletion is independent of the key length and logarithmic in the number of elements in the PATRICIA. In the worst case, the number of bit comparisons during an operation is the number of bits in a key.

Experimental Results: We implemented the memory profiler measuring memory use including heap fragmentation, since this turned out to be the more useful measure. All experiments were performed on an IBM p690. The profiler was attached to executables by replacing the malloc-subsystem through the MALLOCTYPE mechanism of AIX.

The following is an extract from a memtrac summary report of program B. fsmall uses about 16 bytes per block (8 bytes useable, 8 bytes fragmentation for one pointer prefix and one pointer alignment). flarge uses about 460 bytes per block (400 bytes useable, 60 bytes fragmentation)

Extract from a memtrac summary report of program B:
fa1( );fatop( );fsmall( );main( );
  Peak: 16194752 Leak; 16194752
fa1( );fatop( );flarge( );main( );
  Peak: 460448128 Leak: 460-448128

The extract from a memtrac summary report of program B shows the distribution of memory allocations of the call tree of program B with MemTrac. The ratio between the two call chains is not exactly 50 due to internal fragmentation. Fragmentation has a larger relative impact for the 2-pointer blocks than for the 100-pointer blocks, Note also that all memory is correctly reported as leaking. Program B, extended by deallocation of all blocks to program B', provides an interesting vehicle to estimate worst case impact of tracing, since it spends the maximal fraction possible in allocation and deallocation (the blocks are not even initialized) with a simple allocation pattern that is handled efficiently by the allocator.

TABLE 1

Execution time comparisons.

|  | Raw | Traced | tracefile size |
|---|---|---|---|
| B: 2000000 | 2.5 s | 3.4 s | 4.5 kB |
| B': 2000000 | 3.2 s | 4.8 s | 6.6 kB |
| B': 20000000 | 31 s | 46 s | 8.3 kB |
| B': 200000000 | 5 m 15 s | 7 m 52 s | 10.0 kB |
| B'': 20000000 | 42.5 s | 57.5 s | 8.3 kB |
| gcc | 7.0 s | 7.1 s | 3.6 kB |
| gs elisp.ps | 34.5 s | 34.7 s | 116 kB |
| scanline | 173 s | 192 s | 5 kB |
| LVS | 10 hrs | 10 hrs | 250 MB |

Table 1 shows raw elapsed execution time, elapsed time with tracing and the size of the time line file (i.e. records with time stamp, chain index and memory delta). The first four entries show results for program B and its non-leaking derivative B for different numbers of blocks. The blocks are evenly split in large and small. The ratio of the elapsed times of B' converges asymptotically to roughly 1.5 with increasing problem size. The fifth entry is for program B'', i.e. program B extended by a simple initialization of the field elements. The absolute time increase for tracing remains 15 seconds, the relative increase is reduced.

Overall, tracing increased the execution time roughly by 50% of the time that the B* programs spent in the malloc subsystem. This is consistent with observations from real applications, which exhibited execution time inc same order of magnitude as the time spent in subsystem or less.

The last three entries in Table 1 show trace impact on the Gnu c-compiler and ghostscript, Ghostscript was run in batch mode writing output to '/dev/null' on the emacs lisp manual. The main purpose of the tracer was the investigation of memory use in VLSI design tools. We traced numerous runs of large VLSI applications with hundreds of thousands of lines of code for DRC and LVS checking. The runtimes ranged from minutes to more than 10 hours and memory use ranged from tens of MB up to 18 GB. The tracer used less than 2 GB additional memory on the 10 hour and 18 GB LVS run. The zipped trace file was roughly 250 MB in size and covered more than 5000 call chains that allocated memory. The elapsed time was unchanged within the accuracy of measurement.

In all application runs that we performed, the increase in total memory used by tracer and traced process combined was less than 10% compared to the untraced run. The increase in total CPU time by tracer and traced process was also less than 10% in all runs compared to the untraced run. For large applications, the impact of tracing on execution time was negligible, i.e., within the range of fluctuations between repeated runs due I/O performance fluctuations (less than 1%).

The present work provides a memory profiling tool that is capable of handling large VLSI design applications without an intolerable increase in execution time and/or memory. The applications we found that provided proper memory usage results by call chain increased execution time by an order of magnitude and increased memory usage by a factor of two or more. In this disclosure, we present a highly efficient probabilistic approach for profiling general resources which permits measurement of resource use, $M_\psi(t)$, over time for each call chain $\psi$. The present methods are capable of determining the resource use $M\psi(t)$ for all call chains $\psi$ for an application run. The approach permits construction of profiling solutions for different scenarios, e.g., different types of measurement triggers and value accumulation. An analytical framework maps resource use computation problems to numerical integration which allows the derivation of error estimates for varying profiling scenarios. Furthermore, an upper bound of 10% plus the space for recording call chain symbols can be given for the memory overhead of a traced run compared to an untraced run.

A probabilistic mechanism has been implemented for the example of memory profiling and demonstrated with experimental results so that the detailed memory use of very large applications can be efficiently profiled. The profiling does not need recompiling or relinking of the application. Profiling increased the elapsed time and total memory use by less than 10% compared to the unprofiled execution of optimized code. The profiling mechanism has been successfully used in the production of VLSI design automation applications as LVS checking, DRC checking, placement driven synthesis and timing.

Figure 9:
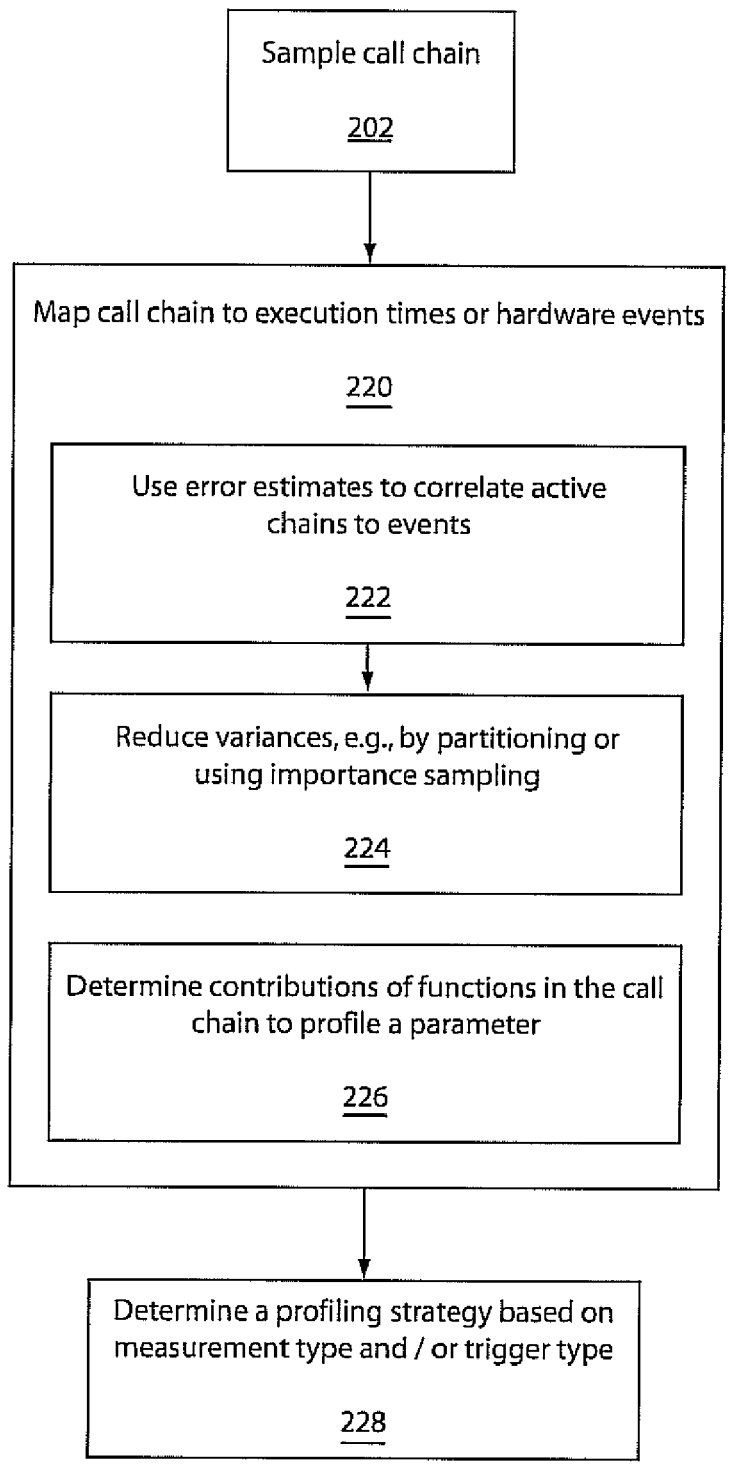
FIG. 9 is a block/flow diagram for a system/method for correlating call chains with hardware events in accordance with one illustrative embodiment.

Referring to FIG. 9, a system/method for correlation of resources with hardware events is illustratively depicted. In block 202, a call chain of functions is sampled based on events to determine when functions of the call chain are active. Numerical analysis of event driven sampling data is preferably performed such that one standard deviation error estimate declines proportional to 1/N where N is a total number of samples.

In block 220, the call chain activity is mapped to hardware events or execution times based upon a probabilistic integration of the functions such that when portions of the call chain are active, resources associated with call chain activity are correlated with the hardware events or execution times. The mapping may include mapping the call chain to resource use based on the call chain which is active at a given sampling point to correlate the resource use changes measured at this sampling point with the call chain.

The probabilistic integration of the functions may include a Monte Carlo integration based on mapping event driven sampling points through a coordinate transformation to a pseudo-random sequence. The selection of the coordinate transformation creates a quasi-random sequence of minimal discrepancy. This creates a sequence of desirable properties out of what comes from the event driven sampling.

In block 222, an error estimate for each sample is employed to determine which chain is active. A Koksma-Hlawka inequality error estimate may be employed, which is bound by a product of the variance of an integrated function in the call chain and a discrepancy of a sequence of functions in the call chain $(V(f)D_N(x_1, \ldots, x_N)$. A sample that hits a call chain may be counted as a zero error contribution for all other call chains, and an error estimate may be employed to associate the sample with a call chain. In block 224, the error estimate is proportional to the variance and the variance is reduced to sample relevant regions more frequently by using importance sampling or partitioning the hardware events, such as (de) allocations based on e.g., memory blocks sizes.

The hardware events may include cache misses, allocation/ deallocation of memory locations, time or memory profiling events, etc. In block 226, contributions from a call chain may be profiled by summing the time or memory usage over time using numerical integration to provide a time profile p(t) or memory usage function M(t). In block 228, a profiling strategy may be developed based on a measurement type wherein the measurement types include at least one of a current value, an integrated value and an average value of a parameter to be profiled, or based on a trigger of a measurement type wherein the triggers include at least one of periodic sampling, random sampling, a specific event, an integration threshold and a differentiation threshold of a parameter to be profiled.

Figure 10:
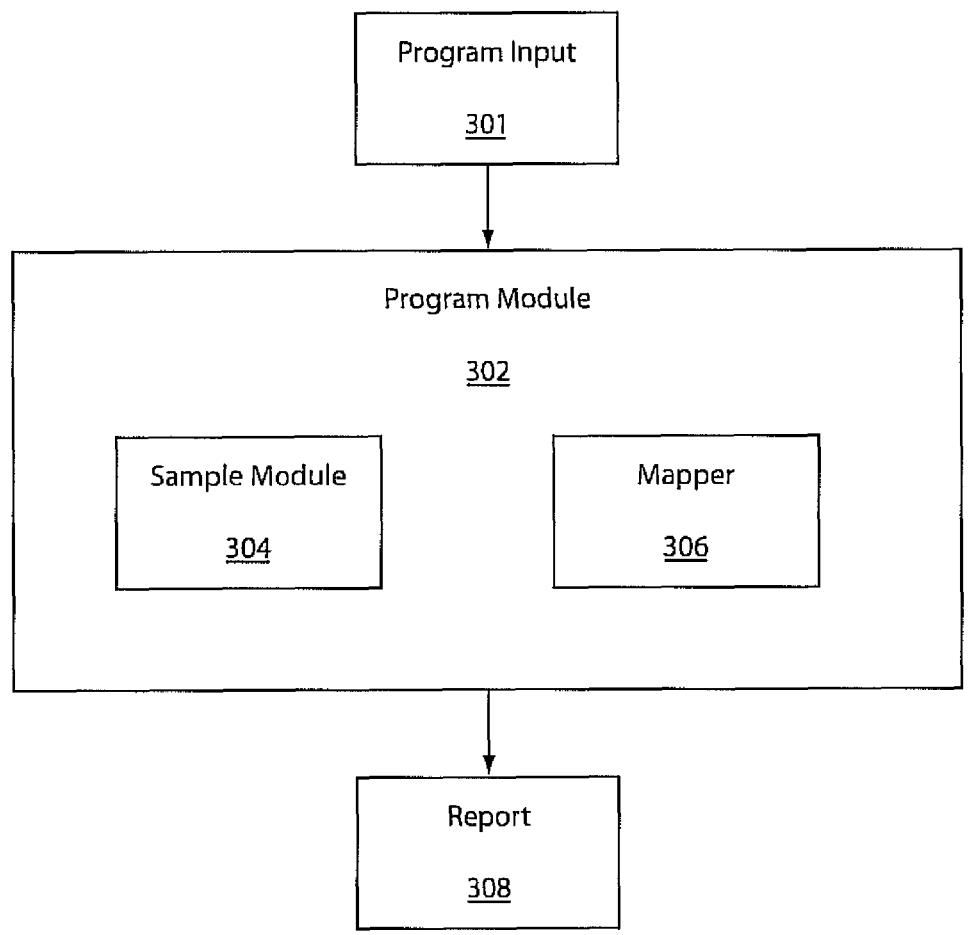
FIG. 10 is a block/flow diagram for a system tool for correlating call chains with hardware events in accordance with one illustrative embodiment.

Referring to FIG. 10, a system 300 for correlation of resources with hardware events is illustratively shown in accordance with one illustrative embodiment. A program module 302 may include a processor or software executed on a processor. Program module 302 provides a tool for profiling systems or software which permits efficient analyses in accordance with the present principles. The program module 302 is preferably stored on computer readable media and configured to map resources to call chains in accordance with the methods set forth herein, e.g., in FIG. 9.

The program module 302 evaluates a system or a program 301 input thereto. The program module 302 includes a sample module 304 configured to sample a call chain of functions based on trigger events to determine when functions of the call chain are active. A mapper 306 is configured to map the call chain to execution times based upon a probabilistic integration of the functions such that when portions of the call chain are active, resources associated with call chain activity are correlated with hardware events. The probabilistic integration of the functions may include based on mapping event driven sampling points through a coordinate transformation to a pseudo-random sequence, wherein the selection of the coordinate transformation creates a quasi-random sequence of minimal discrepancy. The coordinate transformation provides a useful sequence where a time based or other sequence would not be useful.

The mapper 306 may enforce constraints for associating call chains to execution time and/or hardware events or resources. For example, a Koksma-Hlawka inequality error estimate, which is bound by a product of the variance of an integrated function in the call chain and a discrepancy of a sequence of functions in the call chain ($V(f)D_N(x_1, \ldots, x_N)$), may be employed wherein a sample that hits a call chain is counted as a zero error contribution for all other call chains and an error estimate associates the sample with a call chain.

The program module 302 is further configured to output a report 308 which correlates call chain activities to hardware events and to actual hardware, such as memory locations or the like.

Having described preferred embodiments of a system and method for a probabilistic framework for the highly efficient correlation of call chains with hardware events (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for correlation of resources with hardware events, comprising:

sampling a function call chain to determine when functions of the function call chain are active; and mapping, using a processor, the function call chain to hardware events based upon a probabilistic integration of the functions such that when portions of the function call chain are active, resources are associated with function call chain activity.

2. The method as recited in claim 1, wherein numerical analysis of event driven sampling data is performed such that one standard deviation error estimate declines proportional to 1/N where N is a total number of samples.

3. The method as recited in claim 1, wherein mapping includes employing a Koksma-Hlawka inequality error estimate, which is bound by a product of the variance of an integrated function in the function call chain and a discrepancy of a sequence of functions in the function call chain ($V(f)D_N(x_1, \ldots, x_n)$).

4. The method as recited in claim 1, wherein the probabilistic integration of the functions includes a Monte Carlo integration based on mapping event driven sampling points through a coordinate transformation to a pseudo-random sequence.

5. The method as recited in claim 4, wherein a selection of the coordinate transformation creates a quasi-random sequence of minimal discrepancy.

6. The method as recited in claim 1, wherein mapping includes mapping the function call chain to resource use based on the function call chain which is active at a given sampling point to correlate the resource use changes measured at this sampling point with the function call chain.

7. The method as recited in claim 1, wherein the hardware events include memory allocations or deallocations, the method further comprising profiling contributions from the function call chain by summing the memory usage over time using numerical integration to provide a memory usage function M(t).

8. The method as recited in claim 1, further comprising counting a sample that hits the function call chain as a zero error contribution for all other call chains and employing an error estimate to associate the sample with the function call chain.

9. The method as recited in claim 8, wherein the error estimate is proportional to variance, the method further comprising reducing variance to sample relevant regions more frequently by using importance sampling.

10. The method as recited in claim 1, further comprising developing a profiling strategy based on a measurement type wherein the measurement types include at least one of a current value, an integrated value and an average value of a parameter to be profiled.

11. The method as recited in claim 1, further comprising developing a profiling strategy based on a trigger of a measurement type wherein the triggers include at least one of periodic sampling, random sampling, a specific event, an integration threshold and a differentiation threshold of a parameter to be profiled.

12. A computer readable storage medium comprising a computer readable program for correlation of resources with hardware events, wherein the computer readable program when executed on a computer causes the computer to perform the steps of:

sampling a function call chain to determine when functions of the function call chain are active; and mapping, using a processor, the call chain to hardware events based upon a probabilistic integration of the functions such that when portions of the function call chain are active, resources are associated with function call chain activity.

13. The computer readable storage medium as recited in claim 12, wherein numerical analysis of event driven sampling data is performed such that one standard deviation error estimate declines proportional to 1/N where N is a total number of samples.

14. The computer readable storage medium as recited in claim 12, wherein mapping includes employing a Koksma-Hlawka inequality error estimate, which is bound by a product of the variance of an integrated function in the function call chain and a discrepancy of a sequence of functions in the function call chain ($V(f)D_N(x_1, \ldots, x_N)$).

15. The computer readable storage medium as recited in claim 12, wherein the probabilistic integration of the functions includes a Monte Carlo integration based on mapping event driven sampling points through a coordinate transformation to a pseudo-random sequence.

16. The computer readable storage medium as recited in claim 15, wherein a selection of the coordinate transformation creates a quasi-random sequence of minimal discrepancy.

17. The computer readable storage medium as recited in claim 12, wherein mapping includes mapping the function call chain to resource use based on the function call chain which is active at a given sampling point to correlate the resource use changes measured at this sampling point with the function call chain.

18. The computer readable storage medium as recited in claim 12, wherein the hardware events include memory allocations or deallocations, the method further comprising profiling contributions from the function call chain by summing the memory usage over time using numerical integration to provide a memory usage function M(t).

19. The computer readable storage medium as recited in claim 12, further comprising counting a sample that hits the function call chain as a zero error contribution for all other call chains and employing an error estimate to associate the sample with the function call chain.

20. The computer readable storage medium as recited in claim 19, wherein the error estimate is proportional to variance, the method further comprising reducing variance to sample relevant regions more frequently by using importance sampling.

21. The computer readable storage medium as recited in claim 12, further comprising developing a profiling strategy based on a measurement type wherein the measurement types include at least one of a current value, an integrated value and an average value of a parameter to be profiled.

22. The computer readable storage medium as recited in claim 12, further comprising developing a profiling strategy based on a trigger of a measurement type wherein the triggers include at least one of periodic sampling, random sampling, a specific event, an integration threshold and a differentiation threshold of a parameter to be profiled.

23. A system for correlation of resources with hardware events, comprising:
a program module stored on computer readable storage media and configured map resources to call chains, the program module comprising:
a sample module configured to sample a function call chain to determine when functions of the function call chain are active; and
a mapper configured to map the function call chain to hardware events based upon a probabilistic integration of the functions such that when portions of the function call chain are active, resources are associated with function call chain activity.

24. The system as recited in claim 23, wherein the mapped mapper enforces a Koksma-Hlawka inequality error estimate, which is bound by a product of the variance of an integrated function in the call chain and a discrepancy of a sequence of functions in the call chain ($V(f)D_N(x_1, \ldots, x_N)$), wherein a sample that hits the function call chain is counted as a zero error contribution for all other call chains and an error estimate associates the sample with the function call chain.

25. The system as recited in claim 23, wherein the probabilistic integration of the functions includes a Monte Carlo integration based on mapping event driven sampling points through a coordinate transformation to a pseudo-random sequence, wherein a selection of the coordinate transformation creates a quasi-random sequence of minimal discrepancy.

* * * * *